(12) United States Patent
Furey et al.

(10) Patent No.: US 7,710,715 B2
(45) Date of Patent: May 4, 2010

(54) ASSEMBLY AND METHOD FOR ENHANCING STRUCTURAL INTEGRITY AND IMPROVING SERVICEABILITY OF ELECTRONIC CARD DISPOSED IN A COMPUTING ENVIRONMENT

(75) Inventors: Edward F. Furey, Kingston, NY (US); Robert R. Genest, Poughkeepsie, NY (US); John J. Loparco, Poughkeepsie, NY (US); Budy D. Notohardjono, Poughkeepsie, NY (US); John G. Torok, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 12/036,591

(22) Filed: Feb. 25, 2008

(65) Prior Publication Data
US 2009/0218921 A1    Sep. 3, 2009

(51) Int. Cl.
*H05K 7/14* (2006.01)
(52) U.S. Cl. .................. 361/679.02; 361/726; 361/752; 312/223.1
(58) Field of Classification Search ............ 361/679.02, 361/726, 752; 312/223.1, 223.2
See application file for complete search history.

(56) References Cited

U.S. PATENT DOCUMENTS

| 5,224,016 | A  | * | 6/1993 | Weisman et al. | ............. 361/728 |
| 6,601,812 | B2 | * | 8/2003 | LeClair et al. | ........... 248/286.1 |
| 7,336,493 | B2 | * | 2/2008 | Berkenbush et al. | ........ 361/711 |
| 7,505,251 | B2 | * | 3/2009 | Canfield et al. | ............. 361/727 |
| 2006/0044776 | A1 | * | 3/2006 | Xu | .............................. 361/803 |

* cited by examiner

*Primary Examiner*—Jayprakash N Gandhi
*Assistant Examiner*—Ingrid Wright
(74) *Attorney, Agent, or Firm*—Geraldine D. Monteleone; Lily Neff

(57) ABSTRACT

Securing and supporting electronic components in a computer node disposed on a computer rack. The method comprises the steps of first disposing a tray having one or more wedge block assemblies in the rear of said rack such that each wedge block assembly can be moved under and engaged with each node. The wedge block mechanism is retained from side to side using guide brackets. The mechanism and the tray are then torqued into place by using incorporated hard stop feature on said tray. The nodes can then be engaged and disengaged through the engaging and disengaging of the wedge block assembly. This is done by using a rod that is connected to a fastener one end and to a pivot at another end and is integrated into the wedge block mechanism. Once the fastener is moved the pivot is also moved causing the mating and unmating of the node.

19 Claims, 7 Drawing Sheets

ASSEMBLY AND METHOD FOR ENHANCING STRUCTURAL INTEGRITY AND IMPROVING SERVICEABILITY OF ELECTRONIC CARD DISPOSED IN A COMPUTING ENVIRONMENT

BACKGROUND OF THE INVENTION

1. Field of the Invention

This invention relates to the packaging of computing systems and more particularly to a method and assembly for enhancing structural integrity and improving serviceability of large computing system environments.

2. Description of Background

The industry trend has been to continuously increase the number of electronic components inside computing environments while maintaining or even reducing the environment's footprint. Computer environments can vary in range and sophistication. Simple environments can only comprise of a single computer unit while more sophisticated environments can comprise of networks of large computers that are in processing communication with one another. No matter what the size of the environment, the current industry trend has created design challenges for the developers and manufacturers of such environments. When the environments are larger and more sophisticated, however, the issues become more complex. This is because changing even the most isolated component, in such an environment, can affect so many others. This is especially true when such components are packaged together in a single assembly or housed in close proximity. A particularly difficult challenge when designing such computing system environments is the issue of mechanical and structural integrity. This is because so many other factors both depend and affect structural integrity. Heat dissipation, electrical connections, system performance and system recovery are a few such examples.

Conventional large computing system environments that incorporate one or more sophisticated units such as servers, house many electronic components together on boards that are then housed in a single assembly. These assemblies often comprise of metal racks and among the many challenges discussed, dynamic loading effects to these racks and their housed electronic components needs also be considered so as not to cause electrical and mechanical failures.

In recent years, both environmental catastrophic events and man-made conditions have placed an even greater demand on the designers of computer systems to provide environments that are structurally enhanced so as to be able to withstand sudden abnormal shock or persistent vibrations for long periods of time. Such factors as heat dissipation, electrical connections and others have to be considered carefully in the design of such environments as to fully preserve structural integrity. An environment's inability to withstand such extreme conditions may cause data loss and system collapse at a critical time, potentially affecting lives and infrastructures.

The prior art has tried to resolve the problems that arise from catastrophic events that can affect the structural integrity of the environment in a number of ways. Most of these prior art solutions, however, are inadequate or are meant to only provide a temporary relief. For example, in areas that are routinely exposed to earthquakes or vibrations, structures using frame ties or even node lock mechanisms that ultimately bolts the rack and the nodes to the floor are provided in an attempt to stabilize the computing environment during such vibrations. Many of these prior art methods do not mitigate all issues successfully. However, even if they do mitigate most of the aforementioned structural integrity issues, unfortunately, they still pose inherent drawbacks. One serious drawback of such prior art methods has to do with ease of serviceability (including installation and maintenance) of computing environments. Methods such as bolting schemes, for example, render nodes not readily or concurrently serviceable.

Consequently, it is desirable to introduce a solution that can provide improved structural integrity for system environments, enabling them to withstand abnormal shocks and vibrations while not affecting serviceability issues.

SUMMARY OF THE INVENTION

The shortcomings of the prior art are overcome and additional advantages are provided through the provision of a method and incorporated assembly used for servicing and adding to structural integrity of a computer environment having a frame for housing electronic components. The assembly comprises a mounting sub-assembly capable of being secured to the computer frame and a wedge block mechanism. The sub-assembly has a tray with one or more guides through which the wedge block mechanism is secured to the mounting sub-assembly. The wedge block mechanism includes a wedge block able to receive a rod structure. The rod structure is secured at one end to a pivot and at another end to a fastener, such that actuating the fastener can move the pivot from a first to a second position and cause the assembly and mechanism to engage and disengage from the computer frame.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DESCRIPTION OF THE INVENTION

Figure 1:
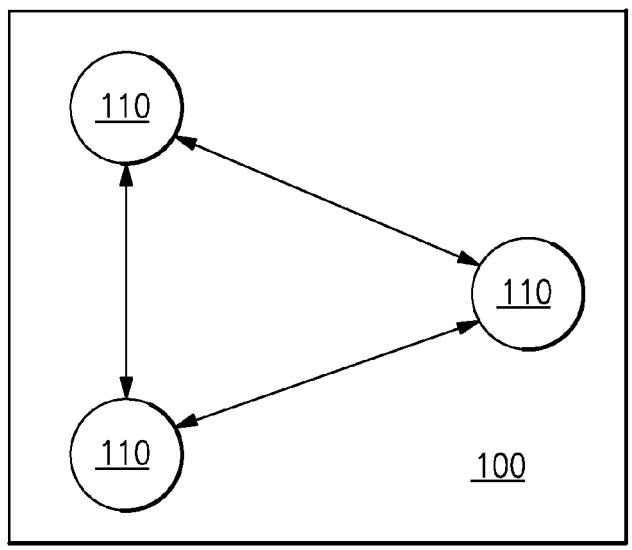
FIG. 1 is an illustration of a computing environment having a plurality of nodes in processing communication with one another.
Figure 2:
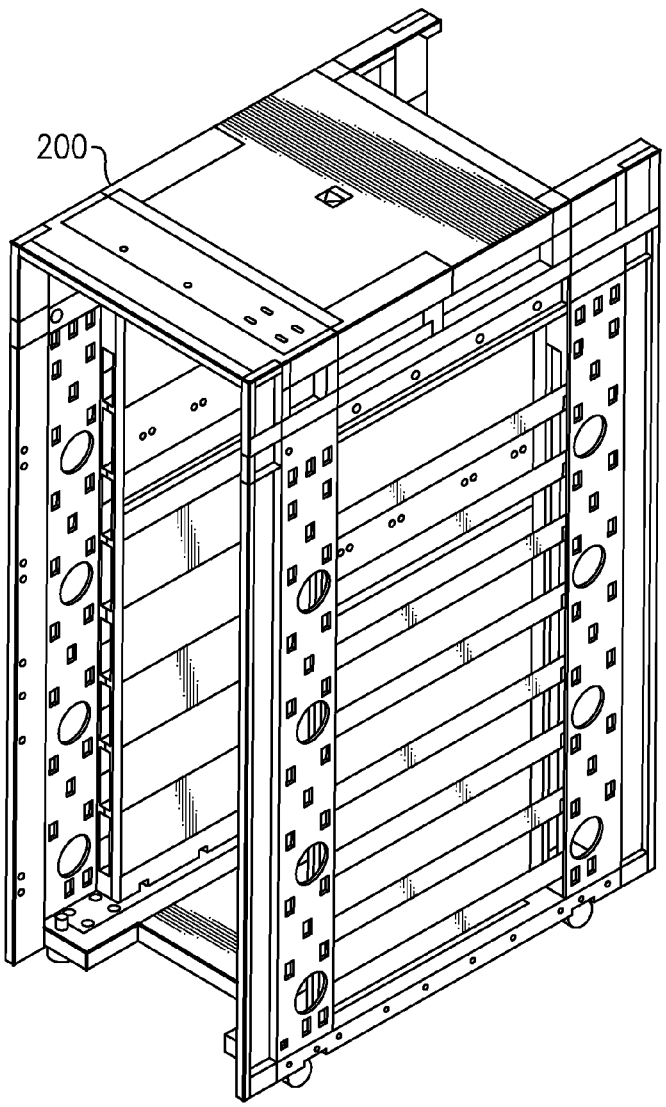
FIG. 2 is an illustration of a computer rack frame for housing CEC, nodes and other electronic components such as used in the computing environment of FIG. 1.

FIG. 1 is an illustration of a computer environment having one or more nodes 110 in processing communication with one another. Each node 110 can comprise a variety of electronic components. In larger computing environments that house servers and central electronic complexes (CECs), a plurality of nodes can be assembled in a single housing that constitutes the CEC. The CEC, one or more nodes, or a variety of other arrangements of electronic components can then be placed if desired in close proximity or even housed together. An example of such a housing is the rack frame structure 200 as illustrated in FIG. 2. The housing structure 200, although not illustrated in FIG. 2, can also include a cover.

In the embodiments that will be discussed herein, a preferred housing arrangement is introduced which incorporates the use of a horizontally mounted mid-plane assembly (i.e., parallel to the ground) with vertically plugged electronic card assemblies (a.k.a. PU Books, Nodes, etc.) using a separable interface connector system. To do so, a Node Actuation Mechanism (NAM) applies the required force to plug the connector with retention limited to the mechanism's fastening torque. In position, mass of the electronic assembly when subjected to mechanical shock and vibration (associated with system shipment and/or an earthquake event) as well as operational vibration (associated with local ground vibration and/or system blowers, compressors, etc.) can force motion between the electronic assembly and the mid-plane thereby adversely effecting the connector system's performance and/or reliability. To counteract this force, it is conceivable to introduce a locking mechanism to lock the nodes using a rear retention bolting scheme. The difficulty, with such designs is that even though they might be successful in mitigating the aforementioned risks to the interconnect system; an inherent drawback is its rendering of the Node to be not readily concurrently serviceable. In many cases, for example, a fan assembly must be removed allowing for an obstructed access to the bolt for its removal prior to node unmating. This action is deemed inherently more difficult and prone to not being successfully completed without risk to system concurrent operation.

The present invention as will be discussed in conjunction with the following figures, introduce an assembly comprised of a wedge block mechanism (hereinafter, WBM) and mounting sub-assembly that provides structural integrity to a computer housing without causing serviceability issues as discussed earlier.

Figure 3:
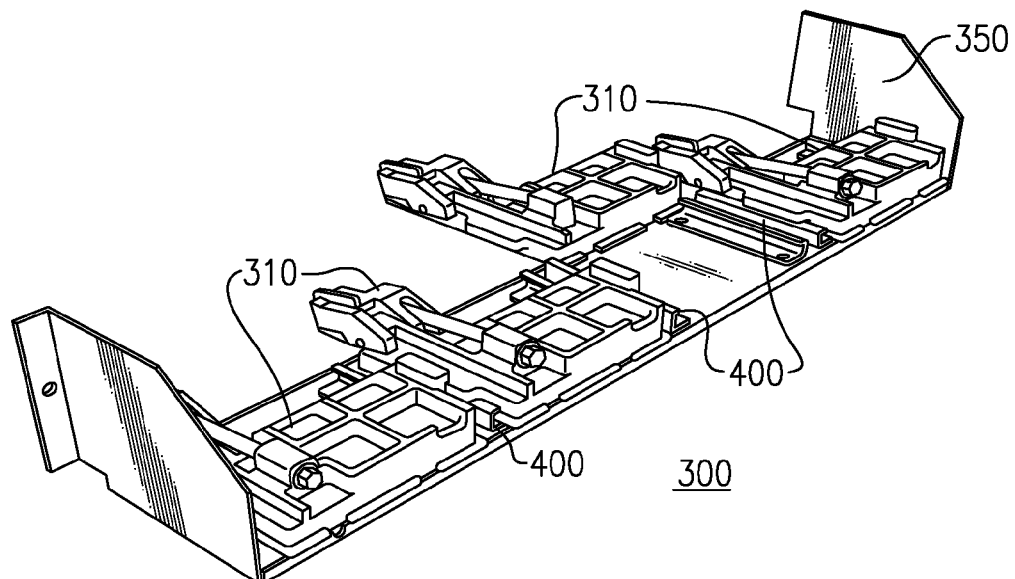
FIG. 3 is a wedge block mechanism mounting assembly as per one embodiment of the present invention.

FIG. 3 provide the wedge block mechanism and mounting sub-assembly as will be presently discussed, with FIGS. 4-8 illustrating the different individual components of the embodiment of FIG. 3. In FIGS. 9-14, different views of the assembled mechanism as disposed in the computing environment is provided.

Referring back to FIG. 3, a perspective side-view illustration of the wedge block and mounting bracket assembly 300 is provided. A plurality of WBMs 310 that effectively function as node locks. The WBMs 310 are held in place by means of mounting sub assembly which will be discussed in more detail by referring to FIGS. 4-6.

Figure 4:
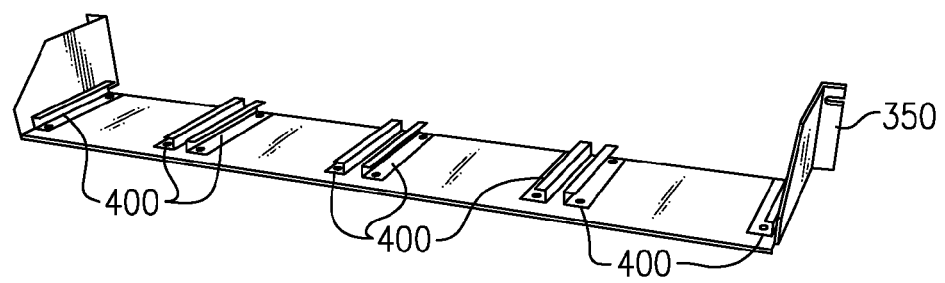
FIGS. 4-6 are illustrations of components of a mounting sub-assembly as used in conjunction with the assembly of the embodiment of FIG. 3.

As illustrated in the perspective side view of FIG. 4, the sub-assembly comprises of a tray 350 and a plurality of guides 400, preferably structured as brackets, used to hold the WBMs 310 in place. In the preferred embodiment of the present invention, a pair of guide brackets 400 is used for each WBM such that the WBMs 310 are retained from side to side. For example, the pair can be disposed on either side each WBM 310, such that they can slide between the brackets 400 easily and be held in place during vibrations and shock.

Figure 5:
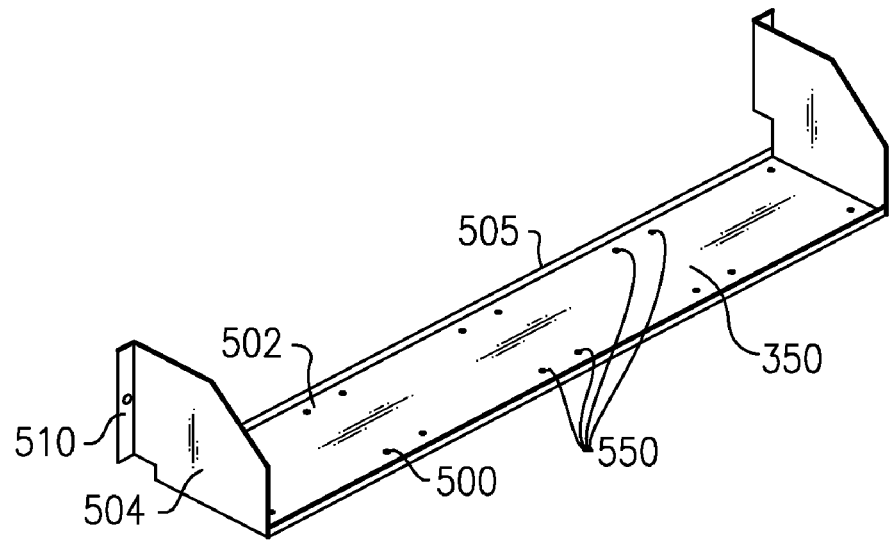

FIG. 5 provides an illustration of the tray 350 without the guide brackets 400. The tray 350 is shaped with a design that is intended to fit the rack securely. A variety of designs can then be selectively used to satisfy such need. In the embodiment provided herein, the tray is comprised of a holding plane 500 and sides 504. The sides do not have to be asymmetrical in shape and may contain further protruding surfaces such as the one referenced as 504 in the Figure. The holding side 500 can also be raised and have raised edges that are shaped as to serve as a hard-stop feature. The hard-stop feature is referenced by numerals 502 in the figure.

Figure 6:
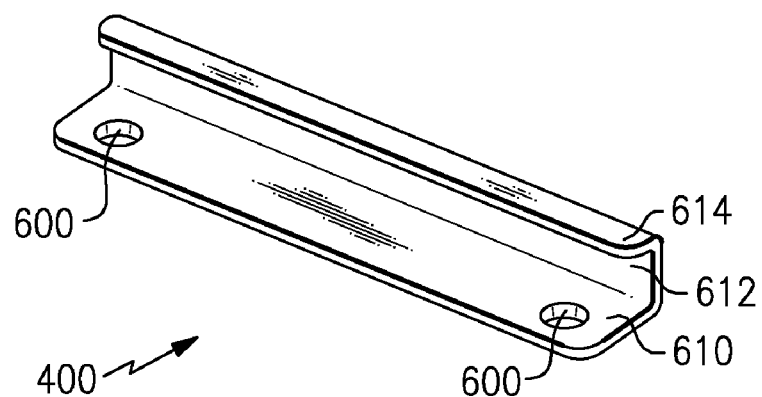

FIG. 6 provides an illustration of one of the guide brackets 400 by itself. In a preferred embodiment, two brackets, one disposed at each end of WBM (node lock) 310 will be used. In the preferred embodiment provided herein the guide bracket 400 is comprises of a securing surface that will be used to secure it to the tray 350. In this particular embodiment, a plurality of holes 600 are provided to help in the securing function. This is not a requirement however. Alternatively, more or less holes or apertures can be used to selectively secure the brackets 400 to the tray 350. Complementary holes and other techniques used to those skilled in the art can also be used on the tray portion 350 as shown in the previous figure and referenced by 550.

Each bracket 400, in this embodiment, is also provided with a side surface 612 with an extending lip 614 disposed at a location to better hold the WBM (node lock) 310 is also provided in this embodiment to enhance the guiding and the securing of the guide brackets when used with the WBM 310.

In one embodiment of the present invention, the tray 350 is formed out of sheet steel metal and a plurality of tapped holes (550) are provided on the tray 350 and used to mount guide brackets at the higher assembly. Similarly, the guide is also formed of sheet metal having a bracket shape as discussed and screwed to the tray 350. Other arrangements, however, as known to those skilled in the art are possible.

FIGS. 7a-d provides different aspects of the WBM 310. The WBM 310 comprises 3 parts in this embodiment: 1) wedge block, as referenced as 700 and shown by FIG. 7d; 2) a pivot, referenced as 800 and also depicted separately in the cross-sectional illustration of FIG. 8; and 3) a rod structure 750 that is secured on one side to the pivot 800 and to the other side to a rotating fastener 760.

The wedge block 700, in one embodiment of the invention, can be molded from aluminum as shown with possible migration to an aluminum die casting. Alternatively injection molded reinforced polymers can be used. In alternate embodiments, other substances can be substituted. The wedge block can also incorporate a raised compartmental structure as shown to enhance and secure the engagement of the assembly and add to the structural integrity of the computer frame.

Figure 7A:
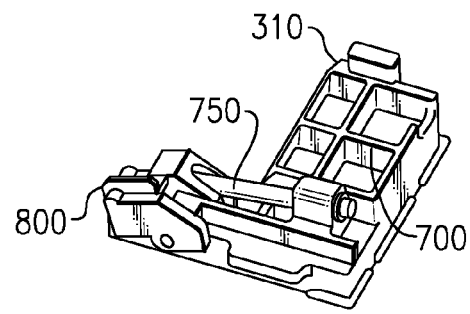
FIGS. 7*a-d* and 8, are an illustration of the different components of the wedge block mechanism as provided in the embodiment of FIG. 3.
Figure 7B:
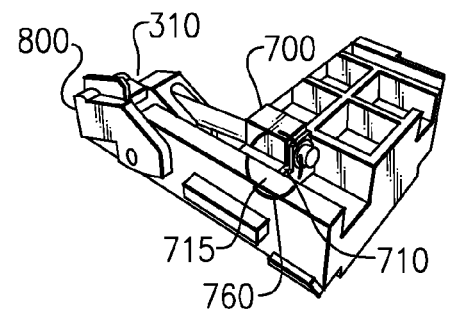
Figure 7C:
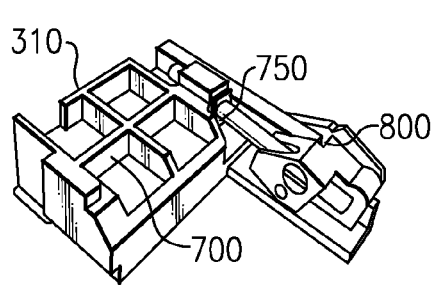
Figure 7D:
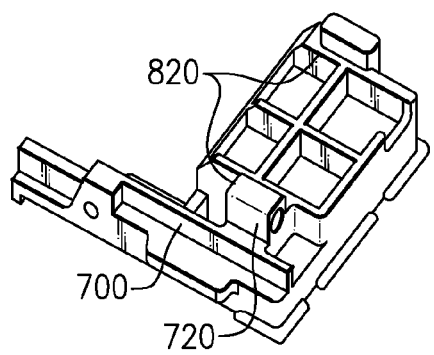
Figure 8:
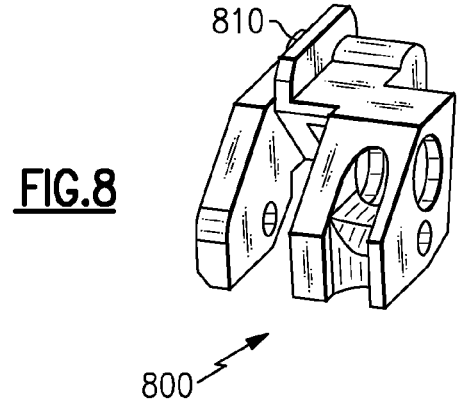

In a preferred embodiment, as shown in FIG. 7d, a clearance hole 720 is press fit to receive the dowel pin (as shown in FIGS. 7a-c). In a preferred embodiment, the clearance hole is circular to provide a better fit for the rod structure 750. Lateral support is also provided (by the node's protruding feature as later discussed and referenced as member 1200) to the WBM's inner walls 820.

The pivot 800, is disposed also on the wedge block 700 and can incorporate the rod structure 750. In a preferred embodiment, the rod structure is circular but can be made to look any other shapes in alternate embodiments (such as cubical). In one preferred embodiment, the rod structure 750 in turn includes an integrated combination of dowel pin(s) and swivel nuts. In a preferred embodiment two of each will be used.

The fastener 760 can be rotating and comprise of such components such as the screw 710 and washer 715 combination that is depicted in the figure. Other fastening means can be equally used as known by those skilled in the art.

In one embodiment, the pivot assembly 800 can also include an engagement feature 810, which in this embodiment resembles a raised protrusion. The engagement feature will mate with a complementary component on the node or the computer housing to ensure a secure fit. In this embodiment, the node has a receiving slot—which is standard and the protrusion is formed to take advantage of the slot feature provided on the node.

Figure 9:
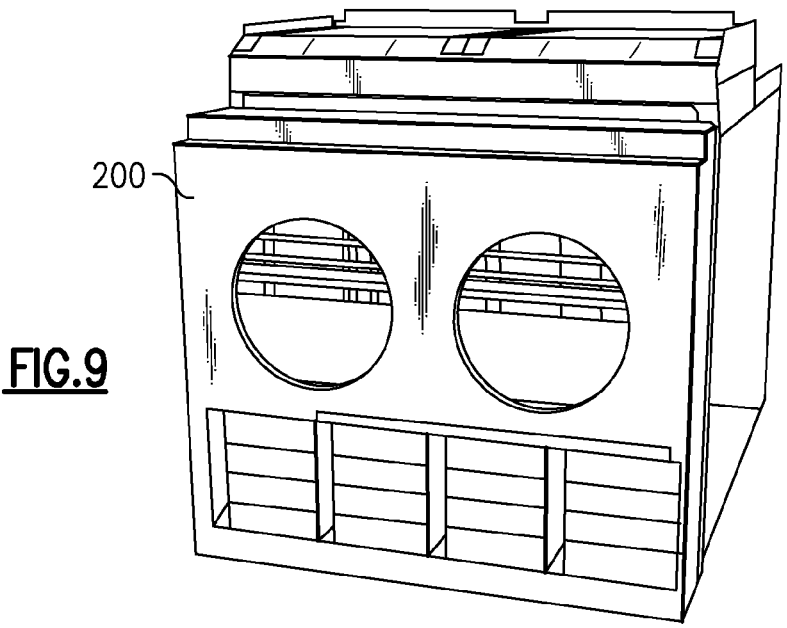
FIG. 9 is an illustration of a rear of a computing housing where the present invention can be installed.

FIG. 9 is an illustration of the rear of a computer rack housing 200, similar to the one discussed in conjunction with FIG. 2. The housing 200 is shown with its covers. The housing 200, as discussed, can incorporate one or more nodes. However, in this particular illustration, the external frame of the housing 200 has been partially removed in areas to show its air moving assembly (AMA), but without nodes and blowers installed to ease understanding of the workings of the invention. It should be noted that, accessibility to the WBMs is through the access panels shown, but can also be selectively designed to be behind a single access door (POR).

Figure 10:
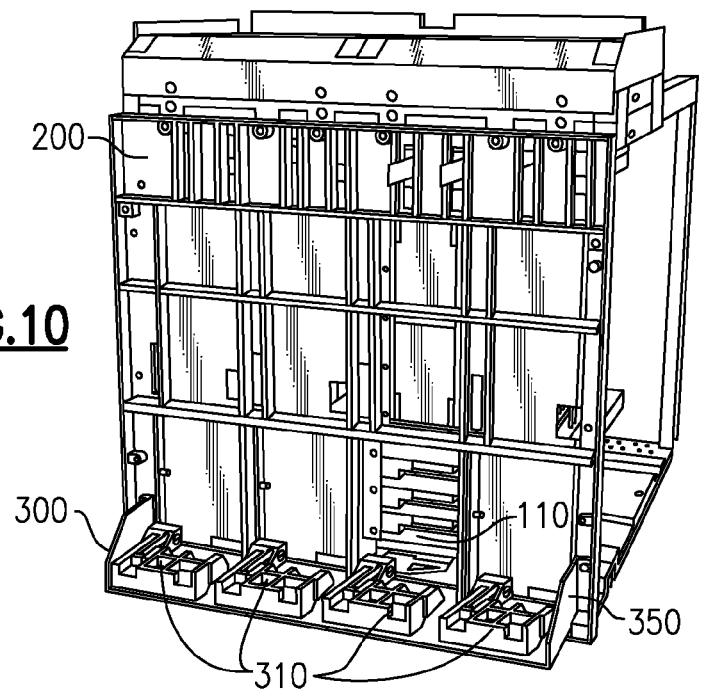
FIG. 10 is an illustration of the wedge block mechanism and mounting assembly secured to the computer housing as provided in FIG. 9.

FIG. 10 is an illustration of the same housing 200 of FIG. 9, with the wedge block mechanisms and mounting bracket assembly installed in the rear of the housing 200. In this embodiment, for ease of understanding the computing environment includes a CEC, provided without its AMA, to reflect that the workings of the present invention can be achievable with or without AMA's installed and without any such scenarios affecting the serviceability. In this embodiment, one node 110 is also shown to be installed.

As can be seen, the wedge block mechanism and sub-assembly 300 is provided to support the rear of the node as illustrated in lieu of a bolt or another cumbersome stabilizer. As shown and previously discussed, included in the implementation is a plurality of wedge block assemblies 310 and its supporting tray 350. In this embodiment, since only one node is installed, only one of the WBMs 310 will be engaged with the node. However, when a plurality of nodes is provided, each WBM will engage with one corresponding node.

Referring back to the discussions conducted with reference of FIGS. 7-10, it can be understood now that once the assembly 300 is slid under the rear of the housing 200 and its nodes, the assembly (tray) will correctly engage by the aid of the incorporated hard-stop feature on the tray and torque into place, the raised feature on the pivot engages into a slot in the node's main structural member (i.e., its mid-stiffener) and provides additional structural support. Selectively, the assembly can also be coupled with a node locking mechanism (NLM) or a NAM and torque into place even more securely if desired.

In other words, in lieu of the bolt or other stabilizing means, each wedge block assembly 300 is slid under the rear of the node 110 to incorporated hard-stop feature on the tray and torque into place. In doing so, the raised feature on the pivot 800 engages into a slot in the node's main structural member (i.e., its mid-stiffener). In addition, the wedge block is retained from side-to-side using the guide brackets as discussed earlier. Coupled with the NAM and NLM and once torque into place, the WBM provides the required vertical and two-axis lateral support to prevents the Nodes motion during shock, vibration and simulated earthquake mechanical excitations.

For servicing or installation of the node(s) 110, the WBM's bolt is simply untorqued and the assembly retracted from under the node prior to node unmating. The process of installing and removal from underneath the node is completely concurrent to the machine's operation. It should be noted that the height of the WBM and the assembly as a whole can be selectively adjusted so that the assembly and WBM can be slid under the computer housing/node for engagement and mating.

Figure 11:
FIG. 11 is an alternate view of the assembly as provided by the embodiment of FIG. 10.

FIG. 11 is a cross sectional illustration of the wedge block mechanism (WBM) 300 and assembly as it lies in a retracted position in reference to the mounting bracket assembly. In the embodiment discussed earlier, this condition will exist, both prior to and after node actuation. The rod structure 750 (i.e. dowel pin/swivel nut combination) is moved by the help of the fastener 760 (i.e. screw/washer), which in turn moves the pivot from a first position to a second position, preferably in an up and down direction, so as to engage and disengage the assembly with nodes and the computer rack or housing. In an alternate embodiment, the combination is designed to make contact with the sidewall of the housing 200 to provide additional support and enhance structural integrity.

Figure 12:
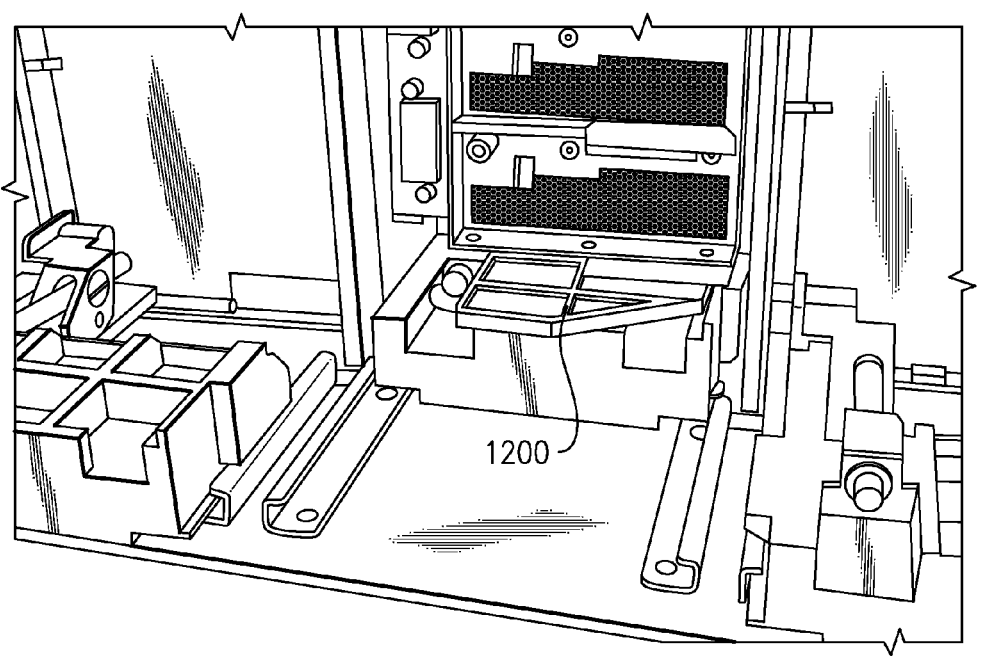
FIG. 12 is an illustration of the mounting bracket assembly in a retracted position further showing a structural support component.

FIG. 12 provides an added embodiment of the present invention where a structural support component 1200 that is integral to the node 200 interfaces to the WBM and assembly 300 to provide additional lateral support and structural integrity to the environment once the wedge assembly and the node(s) are engaged. In one embodiment, as shown in the figure, the extra support component is secured to the tray 350 and is disposed over the WBM 310. Once the assembly is engaged with the housing/node, in one embodiment the support component can extend from the housing 200, for example to sit under the node and interface with the vertical sides of the WBM 820 as shown in FIG. 7*d*, to provide additional structural integrity. This example will be further discussed in conjunction with FIG. 13.

Referring back to FIGS. 11 and 12, it should be noted that the illustrations of both figures, represent a condition following the node actuation where the WBM and assembly 300 is slid into place and actuated via the torque of its screw. Note the torque of the screw prompts the pivot to rotate within the assembly and apply a force to the underside of the Node, thereby stabilizing and retaining it, in this case to the CEC assembly.

Figure 13:
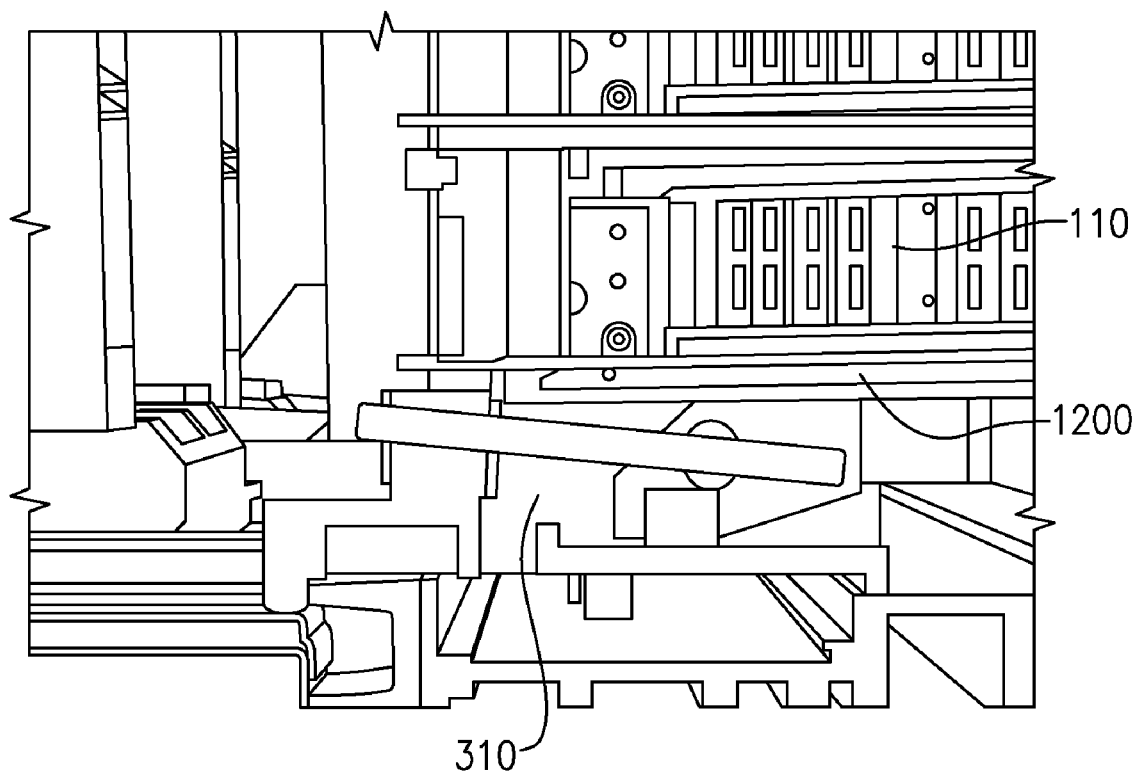
FIG. 13 is a side view illustrations of wedge block mechanism and mounting assembly having the structural support component as provided in the embodiment of FIG. 12.

FIG. 13 provides a side view illustration of the housing 200 following installation. As shown and discussed earlier, the structural component 1200 is shown to be extended from the housing 200 to provide additional structural support when interfacing with the WBM 820 shown in FIG. 7*d*. It should be noted that while, in one embodiment, the support component 1200 is substantially flat (i.e. a flat surface), this is not a requirement and the shape of the component 1200 can be altered to provide a structural fit with the housing/node and to improve structural integrity of the computer. In a preferred embodiment, for example as shown, a raised paneling is provided on the substantially flat surface for that reason. An alternate to this embodiment is to have the member 1200 reside with the WBM 800. In doing so, features similar to WBM 820 would reside within the housing 200 to provide the added lateral support.

Referring back to FIG. 13, as shown, following installation, access to the WBM's actuation screw is made by removing one of the CEC's rear access panels (or by opening the single door; POR) as depicted easily and without additional requirements.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An assembly used for servicing and adding to structural integrity of a computer environment, said assembly comprising:

a mounting sub-assembly capable of engaging and disengaging to a computer frame comprising a frame for housing electronic components, said mounting sub-assembly comprising:

a tray with at least one guide bracket;

a wedge block mechanism secured to said mounting sub-assembly via said guide bracket(s) tray, wherein said wedge block mechanism comprises an actuating screw for actuating the wedge block mechanism by applying torque to the actuating screw; and said wedge block mechanism having a wedge block able to receive a rod structure;

said rod structure being secured at one end to a pivot and at another end to a fastener, such that actuating said fastener can move said pivot from a first to a second position and cause said sub-assembly and wedge block mechanism to engage and disengage from the computer frame, and said wedge block mechanism is actuated via a torque of its actuating screw.

2. The assembly of said claim 1, wherein said wedge block mechanism is to engage and disengage with a node provided in said computer frame.

3. The assembly of claim 2, wherein a plurality of wedge block mechanisms are provided and a plurality of nodes are disposed in said computer frame such that each wedge block mechanism is to engage and disengage with each node.

4. The assembly of claim 1, wherein said rod structure traverses through a clearance hole provided on said wedge block.

5. The assembly of claim 4, wherein said tray can be secured to rear end of a computer rack.

6. The assembly of claim 1, wherein said pivot is also connected to said block and further comprises an engagement feature that secures it with the computer frame when said mounting sub-assembly is engaged with the frame.

7. The assembly of claim 6, wherein said engagement feature is a raised protrusion which will engage with a complementary feature on a node provided in said computer frame.

8. The assembly of claim 1, wherein said wedge block assembly can be secured to a tray and retained from side to side by a pair of guides.

9. The assembly of claim 8, wherein a plurality of guides are positioned on each side of said wedge block mechanism can slide in between said guide.

10. The assembly of claim 8 wherein each guide is a bracket shaped.

11. The assembly of claim 8, wherein each guide bracket further comprises a side surface with an extending lip disposed at a location to better hold the wedge block mechanism.

12. The assembly of claim 1, wherein said tray further comprises a hard stop feature used for engagement and disengagement with the computer frame.

13. The assembly of claim 12, wherein said tray further comprises a holding plane and sides and said sides have raised edges that are shaped as to serve as said hard-stop feature.

14. The assembly of claim 1, wherein height of said mounting sub-assembly and wedge block mechanism can be selectively adjusted such that said wedge block mechanism and tray can be disposed under the computer frame and engage with one or more nodes provided in the frame.

15. The assembly of claim 1, wherein said rod structure further comprises an integrated dowel pin and a swivel nut structure and the screw can be actuated to move the pivot in an up and down direction.

16. The assembly of claim 1 having a structural support component secured to said assembly such that when secured to the frame said component extends into the frame to enhance structural integrity of the computer.

17. The assembly of claim 1 wherein said wedge block mechanism further includes a structural support member within said block such as to provide additional lateral support to said assembly.

18. A method for enhancing structural integrity and improving serviceability of a computer housing having a frame for housing electronic components, comprising the steps of: disposing a mounting sub-assembly having a wedge block mechanism to back of the frame; and providing a support component under any node contacting vertical sides of said mechanism to provide additional structural integrity; actuating said wedge block mechanism via a torque of its screw said sub-assembly and wedge block being able to engage and disengage to the frame and one or more nodes provided inside the frame, wherein said mounting sub-assembly further comprises of a tray with one or more guide brackets securable to said wedge block mechanism and said wedge block mechanism has a wedge block able to receive a rod structure; said rod structure being secured at one end to a pivot and at another end to a fastener, such that actuating said fastener can move said pivot in from a first to a second position and engage said mounting sub-assembly and wedge block mechanism with the computer housing.

19. The method of claim 18, further comprising the steps of; torque said tray into place under said frame and nodes by using an incorporated hard stop feature on said tray; and engaging and disengaging said wedge block mechanism with a node by actuating said fastener.

* * * * *